(12) United States Patent
Reeves et al.

(10) Patent No.: US 12,701,535 B2
(45) Date of Patent: Aug. 4, 2026

(54) SYSTEMS AND METHODS FOR UPDATING MOBILE NETWORK ASSET LOCATIONS USING DEVICE LOCATION INFORMATION

(71) Applicant: T-Mobile USA, Inc., Bellevue, WA (US)

(72) Inventors: Raymond E Reeves, Orlando, FL (US); Hector Manuel Rodriguez Riego, Duluth, GA (US); Jorge Climaco Toledo, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 403 days.

(21) Appl. No.: 18/468,605

(22) Filed: Sep. 15, 2023

(65) Prior Publication Data

US 2025/0097879 A1    Mar. 20, 2025

(51) Int. Cl.
*H04W 64/00*        (2009.01)
*H04W 60/00*        (2009.01)

(52) U.S. Cl.
CPC ........... *H04W 64/00* (2013.01); *H04W 60/00* (2013.01)

(58) Field of Classification Search
None
See application file for complete search history.

(56) References Cited

U.S. PATENT DOCUMENTS

2023/0308833 A1* 9/2023 Yang ........................ G01S 1/042
2024/0365275 A1* 10/2024 Jia ............................ H04W 4/02

* cited by examiner

*Primary Examiner* — Suhail Khan
(74) *Attorney, Agent, or Firm* — Lee & Hayes, P.C.

(57) ABSTRACT
System and methods for updating a location of a mobile network asset are described. A location of a user equipment is sometimes provided by the user equipment as part of a registration request from the user equipment. A location agent of the mobile network receives the location of the user equipment and provides the location to a location manager. The location manager calculates a location of the asset using the location information provided by the user equipment. The calculated location of the asset can be compared to a previously stored location of the asset and updated if needed.

20 Claims, 5 Drawing Sheets

300

302 — DETECT SIGNALING OF UE REGISTERING WITH NODE

304 — DETECT UE LOCATION INFORMATION

306 — RETRIEVE UE LOCATION INFORMATION

308 — PROVIDE UE LOCATION INFORMATION TO LOCATION MANAGER

310 — DETERMINE NODE LOCATION BASED ON UE LOCATION INFORMATION

SYSTEMS AND METHODS FOR UPDATING MOBILE NETWORK ASSET LOCATIONS USING DEVICE LOCATION INFORMATION

BACKGROUND

Location equipment in a cellular network may provide various advantages. For example, if a user calls an emergency line over a cellular network requesting assistance, the location of the mobile device may be used to direct emergency personnel to the user. In another example, parents can use the location of their child's device to monitor and record the location of the child's device when away from the parent. Determining the location of mobile devices often depends on the use of location-based services (LBS) provided by the networks operated by mobile network operators in conjunction with the mobile device capabilities. Some technologies include the use of a comparison signal strengths between several cell towers, global positioning system (GPS) data, mobile network cell identification, Wi-Fi signals, and others. In some of these systems, the location of various assets used in a network are used, such as the location of cellular towers/transmitters.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures can indicate similar or identical items.

DETAILED DESCRIPTION

Overview

Figure 1:
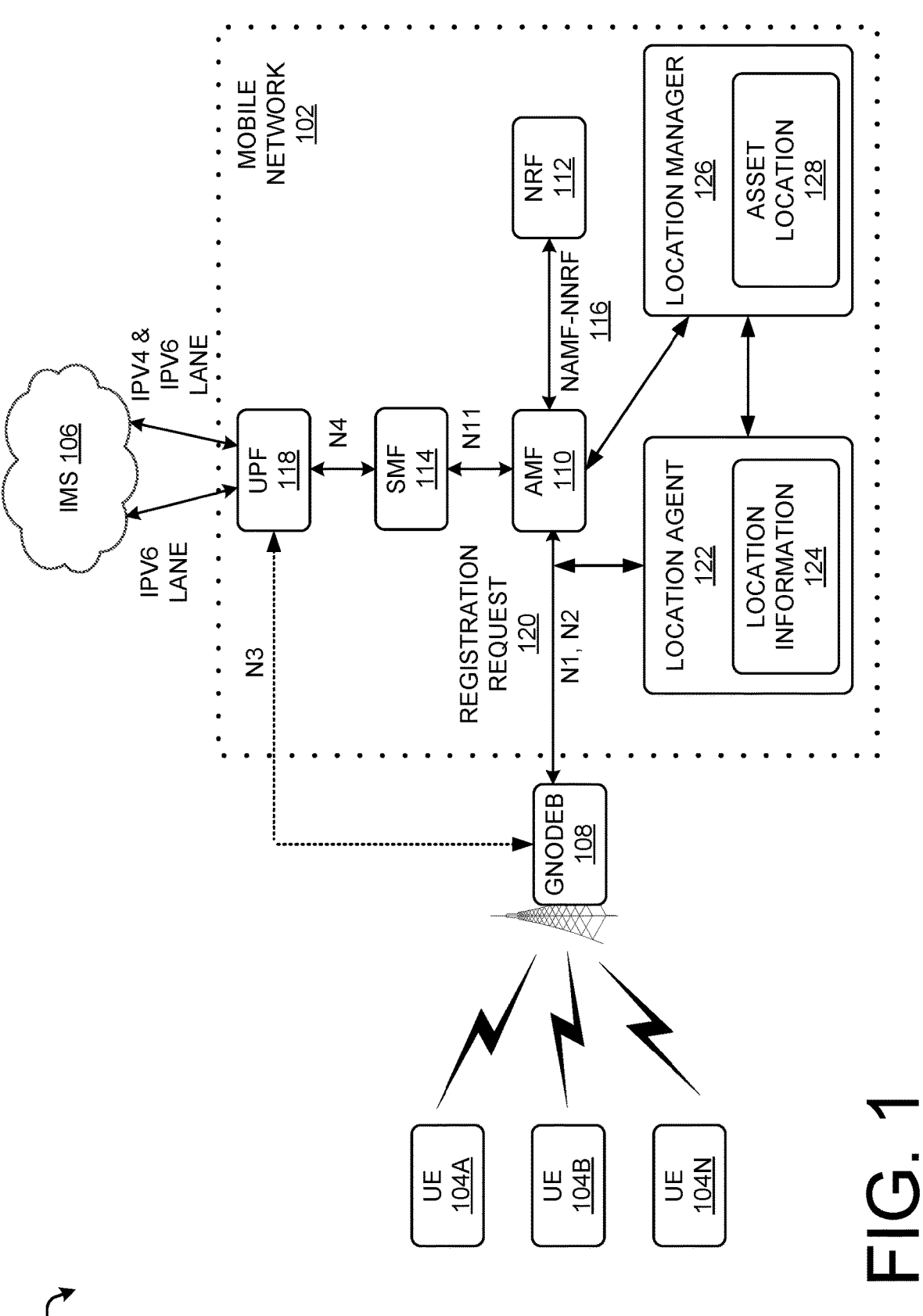
FIG. 1 is a schematic diagram of an illustrative wireless communication network environment in which systems and techniques for scanning user equipment are implemented, in accordance with examples of the disclosure.

This disclosure is directed in part to systems and techniques for updating a location of a mobile network asset through the use of location data provided by a user equipment. When the mobile network receives signaling information from the user equipment, such as when a user equipment registers on a particular node of the mobile network, a location agent that is assigned to monitor signaling data for a particular node determines that the signaling data includes location information of the user equipment provided by the user equipment. The location agent retrieves the location information of the user equipment and uploads the location information to an asset location manager. The asset location manager receives the location information and determines the location of an asset, such as the node to which the user equipment is signaling, using various technologies such as angle of arrival. The determined location of the asset is stored and compared against a previously stored location of the asset. The previously stored location may be the location input by personnel when the asset was originally installed.

When certain assets like a mobile network node are installed or used at a particular location, the location of the asset is often determined by a latitude and longitude provided by a GPS system or a map. In many instances, these locations are highly accurate, meaning that the use of the location of these assets are an accurate basis for determining the location of user equipment in the cell of the asset. However, in some examples, the GPS data or the map information may be inaccurate. In still further examples, the location information may have been concatenated, e.g., 40.34 degrees north entered as opposed to a more precise 40.3445 degrees north. In additional examples, the location information for the asset may have unknowingly entered incorrectly. In situations in which the location of a mobile network asset is incorrect or is inaccurate, location-based systems that use the location may have incorrect determinations of location for user equipment.

Thus, some examples of the presently disclosed subject matter describe the use of a location agent to retrieve the location information of user equipment and uploads the location information to an asset location manager to determine the location of a node to which the user equipment is communicating. Some user equipment is designed to independently, i.e., without the use of a mobile network node, determine the location of the user equipment. As part of the signaling between the location-reporting user equipment and the node, the user equipment reports the location of the user equipment to the node. Rather than disregarding the location information, as is done in some conventional systems, the location agent detects the location data, retrieves the location data, and provides that location data to the location manager. The location manager uses the self-reported location of the location-reporting user equipment to determine the location of the node or asset to which the location-reporting user equipment is communicating.

Illustrative environments, signal flows, and techniques for implementing systems and methods for updating a location of a mobile network asset through the use of location data provided by a user equipment are described below. However, the described systems and techniques may be implemented in other environments.

Illustrative System Architecture

FIG. 1 is a schematic diagram of an illustrative wireless network environment 100 in which the disclosed systems and techniques may be implemented, in accordance with examples of the disclosure. The environment 100 may include a mobile network 102. The mobile network 102 may include various types of networks that support the communication of one or more user equipment 104A-104N (hereinafter referred to generically as "the UE 104," and individually as "the UE 104A," "the UE 104B," and "the UE 104N") using the mobile network 102. It should be noted that although the UE 104 are illustrated as having wireless connections, the UE 104 may be wired and wireless, and may also be part of a network such as an enterprise network (not shown). The UE 104 may be devices such as computer, mobile cellular phones, cellular home Internet devices, and the like. The mobile network 102 may be one or more mobile telecommunication networks that facilitate communications between devices of various types, such as computing device and mobile devices (e.g., UEs). Various connections between devices in the mobile network 102 may be wired, wireless, or a combination thereof. The mobile network 102 may facilitate packet-based communications between the UE 104 and devices on the Internet and/or one or more Internet Protocol Multimedia Systems (IMSs), such as IP multimedia system or subsystem (IMS) 106.

The mobile network 102 may include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which the UE 104 may request and receive access to communicate with network and/or remote devices using any protocol. A UE 104 may access the IMS 106 using protocols such as IPv4 and IPv6. A request for an IPv4v6 communications connection from the device (also known as a "dual stack" connection) may indicate that the UE 104 supports both IPv4 and IPv6. Such a UE 104 may prefer to use IPv6 but is able to use IPv4 in the event that an IPv6 connection is not available.

Communication between the UE 104 and the mobile network 102 may be provided through the use of one or more base stations, represented in FIG. 1 by gNodeB 108. While referred to as a "gNodeB" for explanatory purpose herein, the gNodeB 108 may be any type of base station, including, but not limited to, any type of base transceiver station (BTS), NodeB, eNodeB, gNodeB, and the like. The gNodeB 108 may communicate with other devices and elements in the core of the mobile network 102. The gNodeB 108 is an example of an asset that is installed at a fixed or relatively fixed geographic location to service the UE 104 in the cell provided by the gNodeB 108.

Once the UE 104 has been registered with the mobile network 102, the UE 104 can access services provided by the IMS 106 through the gNodeB 108 by establishing a protocol data unit (PDU) session at the mobile network 102. A PDU session, for example in a 5G network, may be an end-to-end communications session between a device (e.g., the UE 104) and a data network (e.g., the IMS 106). The gNodeB 108 may relay or otherwise convey this PDU session request from the UE to an access management function (AMF) 110 in the core of the wireless network in which the gNodeB is configured. The AMF 110 may interact with one or more other components to perform the operations needed to establish this session, such as authenticating the device and/or user, registering the UE 104 with the mobile network 102.

The AMF 110, based on receiving this request for the establishment of a PDU, i.e., an IPv4-type or IPv6-type session on behalf of the UE 104, may query a new radio function (NRF) 112 for an address (e.g., IP address) for a session management function (SMF) 114 with which it may interact to establish the requested PDU session. The AMF 110 may exchange SMF discovery communications 116 (Namf-Nnrf), which may be called an SMF address request in some examples, with the NRF 112. The NRF 112 returns the identifier of the SMF 114 for use by the AMF 110. Thereafter, the AMF 110 sends a connection request N11 to the selected SMF 114. In examples, the SMF 114 may provide the access information needed by the UE 104 to communicate with a data network using the established session. The SMF 114 provides this information to the AMF 110 for relay to the gNodeB 108 and ultimately to the UE 104 requesting the PDU session. In 5G examples, a message that provides such information may be referred to as a "N1N2MessageTransfer." These and other messages communicating similar information may be referred to generally herein as a "message transfer" messages. The SMF 114 further establishes a connection to its coordinating user plane function (UPF) 118 through an N4 interface, which facilitates communications between the UE 104 and the IMS 106. The SMF 114 generates a connection N3 from the gNodeB 108 to the UPF 118 to provide a communication path between the UE 104, through the gNodeB 108, and to and from the IMS 106 through either the IPv6 or the IPv4&IPv6 lane.

During the registration process, the UE 104 transmits information about the UE 104 to the AMF 110 in a Registration Request message. As part of the Registration Request message, UEs 104 typically transmit information about the UE 104, including, but not limited to, security credentials, and network capabilities. Some UEs are also configured to determine and transmit the location of the UE as part of the Registration Request message. For example, some UEs, such as UE 104B for example, are configured to have location determination systems on the UE that determine the position of the UE without the need to use the mobile network 102. Some examples of this include the use of GPS, Wi-Fi location, and other technologies. When transmitting the Registration Request message, the UE 104B may also transmit the geographic location data for the UE 104B.

When a registration request 120 from the UE 104B is received at the mobile network 102, a location agent 122 detects the incoming registration request 120 and stores the registration request 120. In some examples, the location agent 122 is executed or instantiated by the mobile network 102 and services one node, such as the gNodeB 108, and in other examples, serves more than one node. In some examples, the location agent 122 stores the entire registration request 120. In other examples, the location agent 122 may retrieve on the portion of the registration request 120 comprising location information 124 of the UE 104B. In other examples, the location agent 122 retrieves the registration request 120, determines if the registration request 120 includes location information 124 and stores the location information 124. In still further examples, another entity of the mobile network 102, such as the AMF 110, may be configured with a probe that detects the presence of location information 124 and provides the location information 124 of the registration request 120 to the location agent 122. These and other technologies for providing the location information 124 in the registration request 120 to the location agent 122 may be used and are considered to be within the scope of the presently disclosed subject matter.

The location agent 122 transmits the location information 124 to a location manager 126 executed or instantiated by the mobile network 102. The location manager 126 is configured to determine an asset location 128 of the gNodeB 108 using the location information 124. The location manager 126 may use various technologies for determining the asset location 128, such as angle of arrival, using location information of more than one UE to triangulate the asset location 128, and the like. The asset location 128 can be updated or checked based on calculating the asset location 128 using additional or new location information 124. For example, the asset location 128 can be updated if a predetermined number of asset location 128 is calculated within a predetermined range. The asset location 128 can be transmitted to the AMF 110 or other services of the mobile network 102 for use in location-based services, such as locating other UEs 104A and 104N. The asset location 128 may be used to update a location of the asset, such as the gNodeB 108, based on a confidence level of the asset location 128. The location manager 126 may determine the asset location 128 multiple times using more than one location information 124 of several UEs 104. If the asset location 128 determined for each are within a predetermined range, e.g., a confidence level, the location manager 126 may modify the location information of the asset when the asset was installed or the last stored location information of the asset.

Further, the asset location 128 may be used to determine the location of devices that do not transmit location information. For example, some home Internet services are provided using routers that communicate with base stations using cellular transmissions. The routers are often assigned to a particular house or dwelling. Using the asset location 128 determined by the location information 124 provided by the UE 104B, the location of the router may be more accurately determined because the accuracy of the location of the gNodeB 108 may be increased. The increased accuracy of the gNodeB 108 location thus can be used to verify and increase the accuracy of the location of devices using the mobile network 102.

In other examples, the location manager 126 can be used to detect potential incorrect or erroneous location information provided by the UEs 104N using other location information 124 provided to gNodeB 108. For example, the UEs 104A and 104B may be configured to provide the location information 124. The location manager 126, using the location information 124 provided by the UEs 104A and 104B, determines that the asset location 128 calculated using the location information 124 provided by the UEs 104A and 104B is within a one foot, meaning there is a high probability that the asset location 128 is corrected. In this example, however, the UE 104N is configured to provide an incorrect location information 124, meaning the UE 104N is stating to the mobile network 102 that the UE 104N is in another location than where the UE 104N actually is. The location manager 126 determines the asset location 128 using the incorrect location information 124 provided by the UE 104N. The location manager 126 may determine that the asset location 128 is outside of a range of asset location 128 values, meaning that the UE 104N is likely transmitting an incorrect location information 124. The location manager 126 may generate a notice to the mobile network 102 that the UE 104N is potentially sending incorrect location information.

Illustrative Signal Flows

Figure 2:
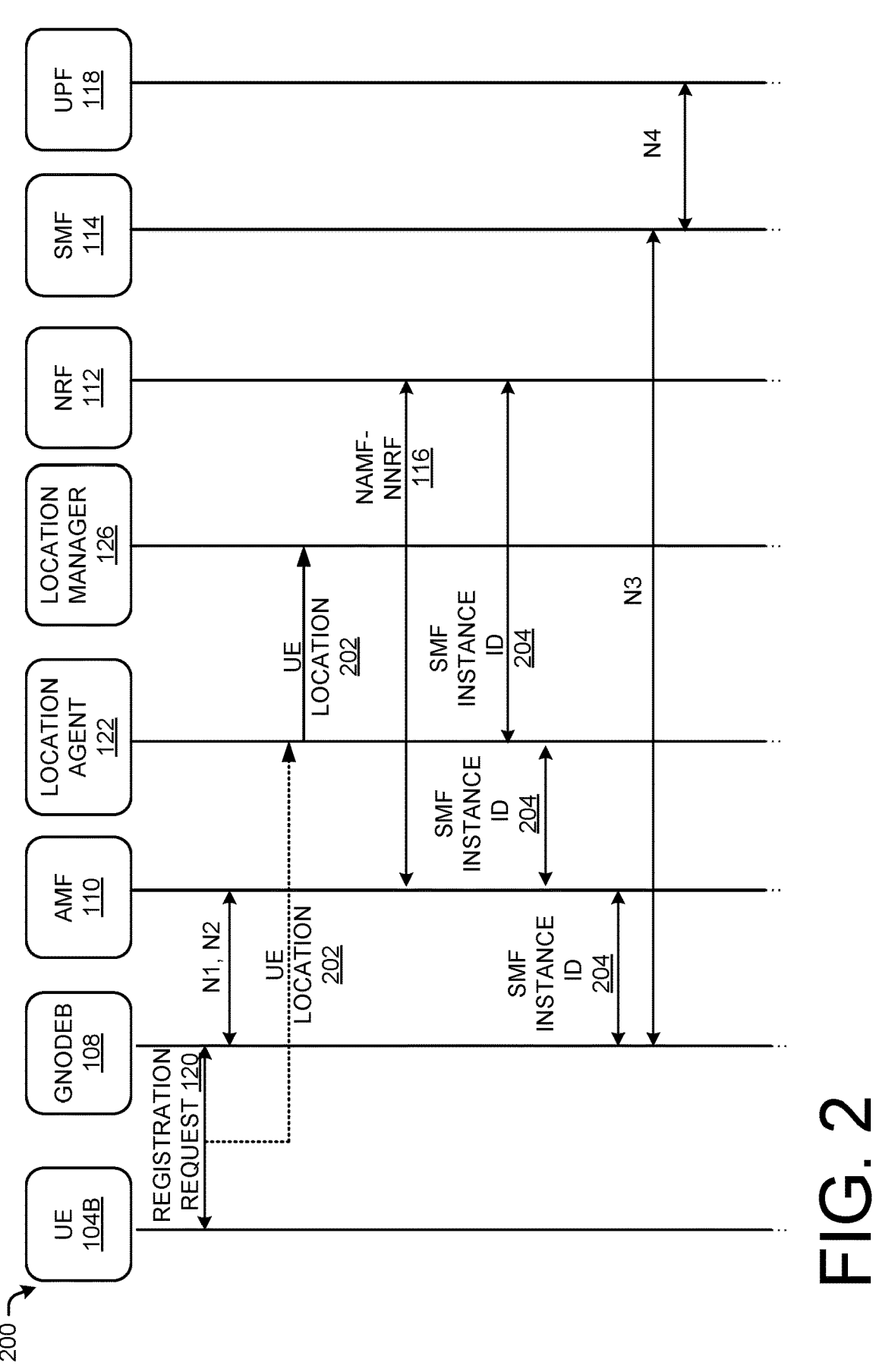
FIG. 2 is an example signal flow diagram for updating a location of a mobile network asset, in accordance with examples of the disclosure.

FIG. 2 illustrates an exemplary signal flow 200 of various messages that may be exchanged in one or more of the disclosed systems and techniques for updating a location of a mobile network asset through the use of location data provided by a user equipment, in accordance with examples of the disclosure. Reference may be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

The UE 104B transmits the registration request 120 to the gNodeB 108. The registration request 120 can include, among other information, a request for an IPv4 lane, an IPv6 lane, and a location of the UE 104B. To register the UE 104B, the gNodeB 108 transmits an N1/N2 communication to the AMF 110. In various examples, the AMF 110 may transmit an SMF discovery communications 116 to the NRF 112 requesting an address for the SMF 114. The SMF discovery communications 116 may include any one or more of an instance identifier of a specific SMF, a specific service, a specific function, a notification of lane type request, and the like. Alternatively, the SMF discovery communications 116 may be more general, requesting an SMF generally or a function to provide particular service (session setup or management), and the like. The SMF discovery communications 116 includes an identifier for the UE 104B. In some examples the identifier is the IMSI for the UE 104B, although other types of identifiers (including the username of the user using the UE 104B) may be used and are considered to be within the scope of the presently disclosed subject matter. The NRF 112 provides the AMF 110 with the address the SMF 114 in an SMF instance ID 204 message. The address of the SMF 114 is transmitted to the gNodeB 108. The gNodeB 108 establishes the N3 interface between the gNodeB 108 and the UPF 118. Further, the N4 interface is established between the SMF 114 and the UPF 118 that is capable of handling requested type of traffic from the UE 104B.

To determine the asset location 128, information in the registration request 120 is provided to the location agent 122. In this example, the location information 124 is part of the registration request 120 in a UE location 202 message. The location agent 122 transmits the location information 124 in the UE location 202 message to the location manager 126. The location manager 126 thereafter determines the asset location 128 using the location information 124 provided in the registration request 120. As noted above, the asset location 128 can be determined using various technologies and techniques, including, but not limited to, angle of incidence/arrival, triangulation, and the like. The location manager 126 can transmit the asset location 128 to various entities.

Illustrative Operations

Figure 3:
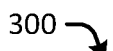
FIG. 3 is a flow diagram of an illustrative process for updating a location of a mobile network asset, in accordance with examples of the disclosure.
Figure 3:
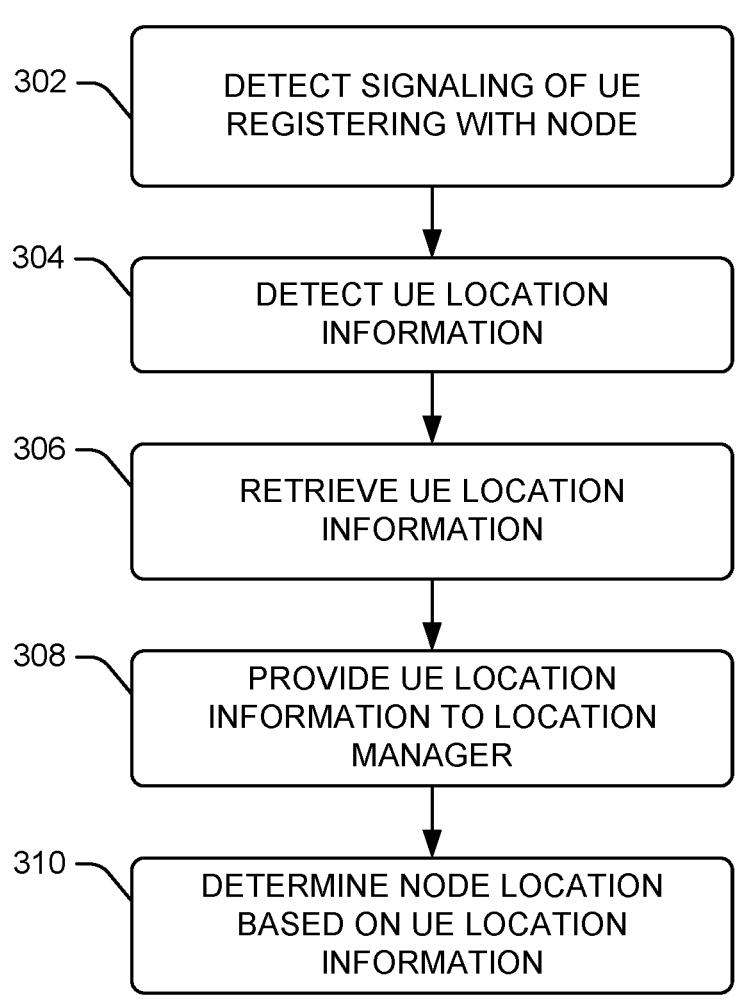

FIG. 3 shows a flow diagram of an illustrative process 300 for updating a location of a mobile network asset through the use of location data provided by a user equipment, in accordance with examples of the disclosure. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the wireless network environment 100 of FIG. 1, however other environments may also be used.

At block 302, the location agent 122 detects the registration request 120 transmitted from the UE 104B to the gNodeB 108. In the example illustrated in FIG. 3, the location agent 122 monitors the gNodeB 108 for registration requests. In other examples, as described above, one or more other components of the mobile network 102 such as the AMF 110, may detect the registration request 120 and extract the location information 124 to provide to the location agent 122. In this example, the location agent 122 is acting as a passive entity.

At block 304, when the location agent 122 detects incoming registration requests, including the registration request 120, to the gNodeB 108, the location agent 122 analyzes the registration request 120 to detect the location information 124. As noted above, the registration requests 120 received at the gNodeB 108 may not always include the location information 124, as not all of the UEs 104 may be configured or capable of generating or transmitting location information of the UE 104.

At block 306, the location information 124 is retrieved by the location agent 122. The location agent 122 analyzes the registration request 120 to find or locate the location information 124. As noted above, the location agent 122 may be an agent for one node, such as the gNodeB 108, or may be used as an agent for multiple nodes. Further, the location agent 122 may be assigned to a particular node, such as the gNodeB 108, based on a geographic proximity to the node.

At block 308, the location information 124 is provided to the location manager 126. As with the location agent 122, the location manager 126 may be configured to serve one mobile network 102 or more than one mobile networks 102 implemented by a mobile network operator.

At block 310, the location manager 126 uses the location information 124 to determine the asset location 128 of the asset, such as the gNodeB 108. The asset location 128 may be determined using various means, such as the angle of arrival of the cellular signal transmitted by the UE 104. For example, the gNodeB 108 may receive the location information 124 from the UE 104B indicating that the UE 104B is at a specific geographic location. If configured, the gNodeB 108 may also detect the angle at which the registration request 120 arrives at the gNodeB 108. Using the location information 124 and the angle of arrival, the location of the gNodeB 108 may be determined. In another example, the location information 124 may be from two or more UEs 104. Knowing the position of two UEs 104, the location manager 126 can use the two positions and the distances of the two positions to triangulate the asset location 128. Additional location information 124 can be used to further refine the asset location 128 or correct the asset location 128.

Additionally, as discussed above, the asset location 128 can be used to determine if one of the UEs 104 is transmitting an incorrect location information. As described above, two points may be used to determine a location. The asset location 128 can be used to determine if a UE 104 is actually in the position stated in the location information.

Example User Equipment

Figure 4:
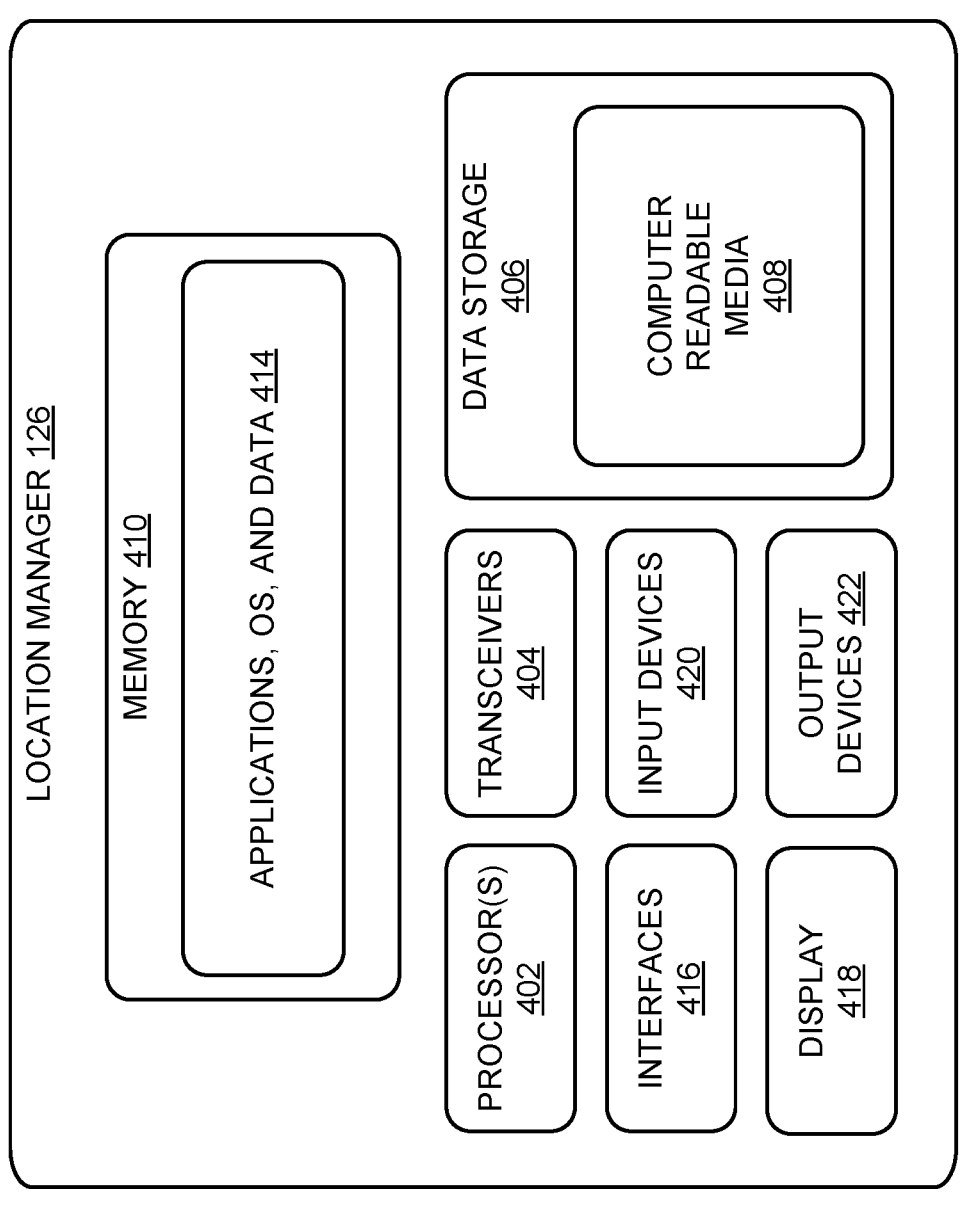
FIG. 4 is a schematic diagram of illustrative components in an example user device that is configured for updating a location of a mobile network asset, in accordance with examples of the disclosure.

FIG. 4 is an example of a location manager 126 (or location agent 122), for use with the systems and methods disclosed herein, in accordance with some examples of the present disclosure. The location manager 126 may include one or more processors 402, one or more transmit/receive antennas (e.g., transceivers or transceiver antennas) 404, and a data storage 406. The data storage 406 may include a computer readable media 408 in the form of memory and/or cache. This computer-readable media may include a non-transitory computer-readable media. The processor(s) 402 may be configured to execute instructions, which can be stored in the computer readable media 408 and/or in other computer readable media accessible to the processor(s) 402. In some configurations, the processor(s) 402 is a Central Processing Unit (CPU), a Graphics Processing Unit (GPU), or both CPU and GPU, or any other sort of processing unit.

The transceiver antenna(s) 404 can exchange signals with a base station, such as gNodeB 108.

The location manager 126 may be configured with a memory 410. The memory 410 may be used to store data received from location agent 122, such as the location information 124, as well as the asset location 128. The memory 410 may be implemented within, or separate from, the data storage 406 and/or the computer readable media 408. The memory 410 may include any available physical media accessible by a computing device to implement the instructions stored thereon. For example, the memory 410 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information, and which may be accessed by the location manager 126.

The memory 410 can store several modules, such as instructions, data stores, and so forth that are configured to execute on the processor(s) 402. In configurations, the memory 410 may also store one or more applications 414 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the gNodeB 108). The applications 414 may further include applications to calculate the asset location 128 . . . . The applications 414 may also include one or more operating systems and/or one or more third-party applications that provide additional functionality to the location manager 126.

Although not all illustrated in FIG. 4, the location manager 126 may also comprise various other components, e.g., a battery, a charging unit, one or more network interfaces 416, an audio interface, a display 418, a keypad or keyboard, and one or more input devices 420, and one or more output devices 422.

Example Computing Device

Figure 5:
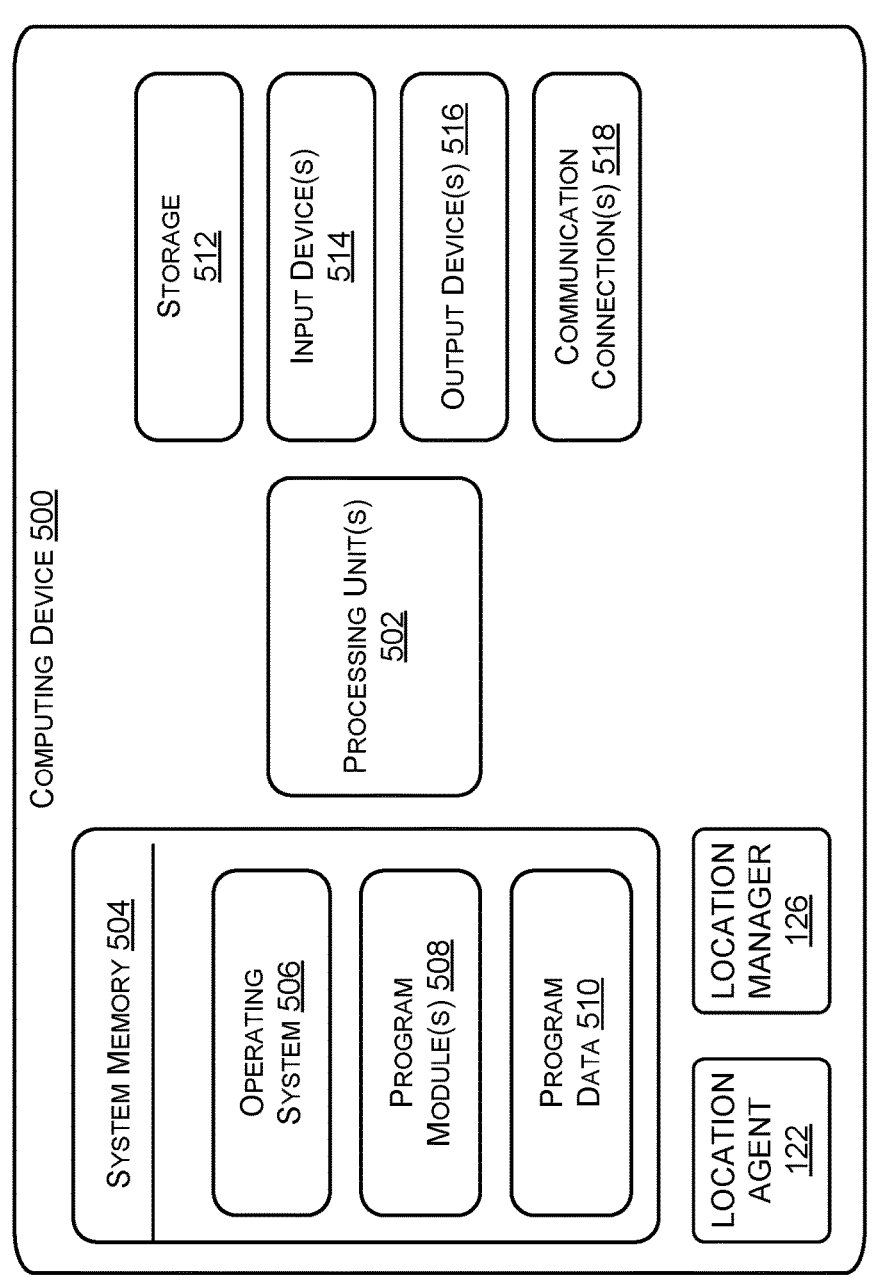
FIG. 5 is a schematic diagram of illustrative components in an example computing device that is configured for updating a location of a mobile network asset, in accordance with examples of the disclosure.
Figure 5:

FIG. 5 is an example of a computing device 500 for use with the systems and methods disclosed herein, in accordance with some examples of the present disclosure. The computing device 500 can be used to implement various components of a core network, a base station, and/or any servers, routers, gateways, gateway elements, administrative components, etc. that can be used by a communication provider. The computing device 500 can further be used to implement the mobile network 102, the location agent 122, and/or the location manager 126.

In various embodiments, the computing device 500 can include one or more processing units 502 and system memory 504. Depending on the exact configuration and type of computing device, the system memory 504 can be volatile (such as RAM), nonvolatile (such as ROM, flash memory, etc.) or some combination of the two. The system memory 504 can include an operating system 506, one or more program modules 508, and can include program data 510. The system memory 504 may be secure storage or at least a portion of the system memory 504 can include secure storage. The secure storage can prevent unauthorized access to data stored in the secure storage. For example, data stored in the secure storage can be encrypted or accessed via a security key and/or password. The program modules can include instructions to execute location agent 122 and/or the location manager 126 of FIG. 1.

The computing device 500 can also include additional data storage devices (removable and/or non-removable)

such as, for example, magnetic disks, optical disks, or tape. Such additional storage is illustrated in FIG. 5 by storage 512.

Non-transitory computer storage media of the computing device 500 can include volatile and nonvolatile, removable and non-removable media implemented in any method or technology for storage of information, such as computer readable instructions, data structures, program modules, or other data. The system memory 504 and storage 512 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 500. Any such non-transitory computer readable storage media can be part of the computing device 500.

In various embodiment, any or all of the system memory 504 and storage 512 can store programming instructions which, when executed, implement some or all of the functionality described above as being implemented by one or more systems configured in the environment 100 and/or components of the mobile network 102.

The computing device 500 can also have one or more input devices 514 such as a keyboard, a mouse, a touch-sensitive display, voice input device, etc. The computing device 500 can also have one or more output devices 516 such as a display, speakers, a printer, etc. can also be included. The computing device 500 can also contain one or more communication connections 518 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: All methods, systems, and apparatuses, including all equivalents of the presently disclosed subject matter.

Clause 1. A method, comprising: receiving, at node of a network, a registration request from a user equipment, wherein the registration request comprises a security credential, a network capability, and a geographic location of the user equipment; receiving, at a location agent of the network, the geographic location of the user equipment; providing, from the location agent to a location manager; the geographic location of the user equipment; and calculating, by the location manager, a location of the node of the network using the geographic location of the user equipment.

Clause 2. The method of clause 1, wherein calculating, by the location manager, the location of the node of the network using the geographic location of the user equipment comprises using an angle of arrival of the registration request of the user equipment and the geographic location of the user equipment.

Clause 3. The method of any of clauses 1-2, wherein calculating, by the location manager, the location of the node of the network using the geographic location of the user equipment comprises using a geographic location of a second user equipment and the geographic location of the user equipment to triangulate the location of the node.

Clause 4. The method of any of clauses 1-3, further comprising updating the location of the node upon calculating a predetermined number of locations of the node are calculated within a predetermined range based on a plurality of second location information received from a plurality of second user equipment.

Clause 5. The method of any of clauses 1-4, further comprising determining a second location of a second user equipment using the location of the node of the network.

Clause 6. The method of any of clauses 1-5, further comprising generating a notice if the second location of the second user equipment is different than a geographic location of the second user equipment received by the network in a second registration request from the second user equipment.

Clause 7. The method of any of clauses 1-6, wherein receiving, at the location agent of the network, the geographic location of the user equipment comprises monitoring, by the location agent, incoming registration requests from one or more user equipment to the node of a network.

Clause 8. The method of any of clauses 1-7, wherein receiving, at the location agent of the network, the geographic location of the user equipment comprises: extracting, by an access management function, the geographic location from the registration request; and providing, by the access management function, the geographic location to the location agent.

Clause 9. A non-transitory computer-readable media storing computer-executable instructions that, when executed by one or more processors, cause the one or more processors to perform operations comprising: receiving, at node of a network, a registration request from a user equipment, wherein the registration request comprises a security credential, a network capability, and location information of the user equipment; receiving, at a location agent of the network, the location information of the user equipment; providing, from the location agent to a location manager; the location information of the user equipment; and calculating, by the location manager, a location of the node of the network using the location information of the user equipment.

Clause 10. The non-transitory computer-readable media of clause 9, wherein the computer-executable instructions that, when executed by the one or more processors, cause the one or more processors to perform operations comprising calculating, by the location manager, the location of the node of the network using the location information of the user equipment further comprises computer-executable instructions for using an angle of arrival of the registration request of the user equipment and the location information of the user equipment.

Clause 11. The non-transitory computer-readable media of any of clauses 9-10, wherein the computer-executable instructions that, when executed by the one or more processors, cause the one or more processors to perform operations comprising calculating, by the location manager, the location of the node of the network further comprises computer-executable instructions for using the location information of the user equipment comprises using a location information of a second user equipment and the location information of the user equipment to triangulate the location of the node.

Clause 12. The non-transitory computer-readable media of any of clauses 9-11, further comprising computer-executable instructions that, when executed by the one or more processors, cause the one or more processors to perform operations comprising updating the location of the node upon calculating a predetermined number of locations of the node are calculated within a predetermined range based on a plurality of second location information received from a plurality of second user equipment.

Clause 13. The non-transitory computer-readable media of any of clauses 9-12, further comprising computer-executable instructions that, when executed by the one or more processors, cause the one or more processors to perform operations comprising determining a second location of a second user equipment using the location of the node of the network.

Clause 14. The non-transitory computer-readable media of any of clauses 9-13, further comprising computer-executable instructions that, when executed by the one or more processors, cause the one or more processors to perform operations comprising generating a notice if the second location of the second user equipment is different than a location information of the second user equipment received by the network in a second registration request from the second user equipment.

Clause 15. The non-transitory computer-readable media of any of clauses 9-14, wherein the computer-executable instructions that, when executed by the one or more processors, cause the one or more processors to perform operations comprising receiving, at the location agent of the network, the location information of the user equipment further comprises computer-executable instructions for monitoring, by the location agent, incoming registration requests from one or more user equipment to the node of a network.

Clause 16. The non-transitory computer-readable media of any of clauses 9-15, wherein the computer-executable instructions that, when executed by the one or more processors, cause the one or more processors to perform operations comprising receiving, at the location agent of the network, the location information of the user equipment further comprises computer-executable instructions for: extracting, by an access management function, the location information from the registration request; and providing, by the access management function, the location information to the location agent.

Clause 17. A network, comprising: a memory storing computer-executable instructions; and a processor in communication with the memory, the computer-executable instructions causing the processor to perform acts comprising: executing a location agent configured to: receive a location information of a user equipment from a registration request received at a node of the network; and provide the location information of the user equipment to a location manager; and executing the location manager, wherein the location manager is configured to: receive the location information of the user equipment from the location agent; calculate a location of the node of the network using the location information of the user equipment using: an angle of arrival of the registration request; or a geographic location of a second user equipment and the location information of the user equipment; and update, at the network, the location of the node.

Clause 18. The network of clause 17, wherein the location agent is further configured to monitor the node for incoming registration requests.

Clause 19. The network of any of clauses 17-18, wherein the location manager is further configured to determine a location of a second user equipment using the location of the node of the network calculated by the location manager from the location information of the user equipment.

Clause 20. The network of any of clauses 17-19, wherein the node is a base station of the network.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
    receiving, at a node of a network, a registration request from a user equipment, wherein the registration request comprises a security credential, a network capability, and a geographic location of the user equipment;
    receiving, at a location agent of the network, the geographic location of the user equipment;
    providing, from the location agent to a location manager; the geographic location of the user equipment; and calculating, by the location manager, a location of the node of the network using the geographic location of the user equipment.

2. The method of claim 1, wherein calculating, by the location manager, the location of the node of the network using the geographic location of the user equipment comprises using an angle of arrival of the registration request of the user equipment and the geographic location of the user equipment.

3. The method of claim 1, wherein calculating, by the location manager, the location of the node of the network using the geographic location of the user equipment comprises using a geographic location of a second user equipment and the geographic location of the user equipment to triangulate the location of the node.

4. The method of claim 1, further comprising updating the location of the node upon calculating a predetermined number of locations of the node are calculated within a predetermined range based on a plurality of second location information received from a plurality of second user equipment.

5. The method of claim 1, further comprising determining a second location of a second user equipment using the location of the node of the network.

6. The method of claim 5, further comprising generating a notice if the second location of the second user equipment is different than a geographic location of the second user equipment received by the network in a second registration request from the second user equipment.

7. The method of claim 1, wherein receiving, at the location agent of the network, the geographic location of the user equipment comprises monitoring, by the location agent, incoming registration requests from one or more user equipment to the node of the network.

8. The method of claim 1, wherein receiving, at the location agent of the network, the geographic location of the user equipment comprises:
    extracting, by an access management function, the geographic location from the registration request; and
    providing, by the access management function, the geographic location to the location agent.

9. A non-transitory computer-readable media storing computer-executable instructions that, when executed by one or more processors, cause the one or more processors to perform operations comprising:
    receiving, at a node of a network, a registration request from a user equipment, wherein the registration request comprises a security credential, a network capability, and location information of the user equipment;
    receiving, at a location agent of the network, the location information of the user equipment;
    providing, from the location agent to a location manager; the location information of the user equipment; and
    calculating, by the location manager, a location of the node of the network using the location information of the user equipment.

10. The non-transitory computer-readable media of claim 9, wherein the computer-executable instructions that, when executed by the one or more processors, cause the one or more processors to perform operations comprising calculating, by the location manager, the location of the node of the network using the location information of the user equipment further comprises computer-executable instructions for using an angle of arrival of the registration request of the user equipment and the location information of the user equipment.

11. The non-transitory computer-readable media of claim 9, wherein the computer-executable instructions that, when executed by the one or more processors, cause the one or more processors to perform operations comprising calculating, by the location manager, the location of the node of the network further comprises computer-executable instructions for using the location information of the user equipment comprises using a location information of a second user equipment and the location information of the user equipment to triangulate the location of the node.

12. The non-transitory computer-readable media of claim 9, further comprising computer-executable instructions that, when executed by the one or more processors, cause the one or more processors to perform operations comprising updating the location of the node upon calculating a predetermined number of locations of the node are calculated within a predetermined range based on a plurality of second location information received from a plurality of second user equipment.

13. The non-transitory computer-readable media of claim 9, further comprising computer-executable instructions that, when executed by the one or more processors, cause the one or more processors to perform operations comprising determining a second location of a second user equipment using the location of the node of the network.

14. The non-transitory computer-readable media of claim 13, further comprising computer-executable instructions that, when executed by the one or more processors, cause the one or more processors to perform operations comprising generating a notice if the second location of the second user equipment is different than a location information of the second user equipment received by the network in a second registration request from the second user equipment.

15. The non-transitory computer-readable media of claim 9, wherein the computer-executable instructions that, when executed by the one or more processors, cause the one or more processors to perform operations comprising receiving, at the location agent of the network, the location information of the user equipment further comprises computer-executable instructions for monitoring, by the location agent, incoming registration requests from one or more user equipment to the node of the network.

16. The non-transitory computer-readable media of claim 9, wherein the computer-executable instructions that, when executed by the one or more processors, cause the one or more processors to perform operations comprising receiving, at the location agent of the network, the location information of the user equipment further comprises computer-executable instructions for:

extracting, by an access management function, the location information from the registration request; and providing, by the access management function, the location information to the location agent.

17. A network, comprising:

a memory storing computer-executable instructions; and a processor in communication with the memory, the computer-executable instructions causing the processor to perform acts comprising:

executing a location agent configured to:

receive a location information of a user equipment from a registration request received at a node of the network; and provide the location information of the user equipment to a location manager; and executing the location manager, wherein the location manager is configured to:

receive the location information of the user equipment from the location agent;

calculate a location of the node of the network using the location information of the user equipment using:

an angle of arrival of the registration request; or a geographic location of a second user equipment and the location information of the user equipment; and update, at the network, the location of the node.

18. The network of claim 17, wherein the location agent is further configured to monitor the node for incoming registration requests.

19. The network of claim 17, wherein the location manager is further configured to determine a location of a second user equipment using the location of the node of the network calculated by the location manager from the location information of the user equipment.

20. The network of claim 17, wherein the node is a base station of the network.

* * * * *